(12) United States Patent
Adams et al.

(10) Patent No.: US 8,578,171 B2
(45) Date of Patent: Nov. 5, 2013

(54) AUTOMATED SELECTION AND INCLUSION OF A MESSAGE SIGNATURE

(75) Inventors: Neil P. Adams, Waterloo (CA); David Victor MacFarlane, Waterloo (CA); Herbert A. Little, Wateroo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/617,039

(22) Filed: Sep. 14, 2012

(65) Prior Publication Data

US 2013/0066999 A1    Mar. 14, 2013

Related U.S. Application Data

(63) Continuation of application No. 11/159,101, filed on Jun. 23, 2005, now Pat. No. 8,429,411.

(30) Foreign Application Priority Data

Jun. 21, 2005   (EP) ..................................... 05105515

(51) Int. Cl.
*G06F 21/00*   (2013.01)

(52) U.S. Cl.
USPC ......................................................... 713/176

(58) Field of Classification Search
USPC ............................... 713/176, 161, 169; 726/2
See application file for complete search history.

(56) References Cited

U.S. PATENT DOCUMENTS

| | | | |
|---|---|---|---|
| 5,548,646 A | 8/1996 | Aziz et al. | |
| 5,754,306 A | 5/1998 | Taylor et al. | |
| 6,157,945 A | 12/2000 | Balma et al. | |
| 6,157,954 A | 12/2000 | Moon et al. | |
| 6,510,453 B1 | 1/2003 | Apfel et al. | |
| 6,625,642 B1 | 9/2003 | Naylor et al. | |
| 6,732,101 B1 | 5/2004 | Cook | |
| 6,751,463 B1 | 6/2004 | Lorello et al. | |

(Continued)

FOREIGN PATENT DOCUMENTS

| EP | 0971519 A1 | 1/2000 |
|---|---|---|
| EP | 1026857 A2 | 8/2000 |

OTHER PUBLICATIONS

"How to Create an Out of Office Reply in Lotus Notes", tutorial, May 2006 (5 pages).

(Continued)

*Primary Examiner* — Brandon Hoffman
*Assistant Examiner* — Anthony Brown
(74) *Attorney, Agent, or Firm* — Finnegan, Henderson, Farabow, Garrett & Dunner LLP

(57) ABSTRACT

A system and method for the creation and automated selection and inclusion an automated signature text with an electronic message, wherein the automated selection of the automated signature text is dependent on attributes of the message, the designated recipients, or attributes of the designated recipients as compared to the sender's attributes, such as the encoding type and/or transport method selected for the electronic message or the location of the recipient without the need for multiple user profiles or manual editing by the sender. At least one of a plurality of automated signature texts is associated with at least one encoding type of a plurality of encoding types, at least one message transport type, or with at least one predetermined recipient attribute or the outcome of a comparison of the recipient attribute with the sender's attributes. The appropriate automated signature text is inserted prior to encoding of the message for transport.

37 Claims, 8 Drawing Sheets

(56) References Cited

U.S. PATENT DOCUMENTS

| | | | |
|---|---|---|---|
| 6,981,023 | B1 | 12/2005 | Hamilton et al. |
| RE39,360 | E | 10/2006 | Aziz et al. |
| 7,155,487 | B2 | 12/2006 | Yau et al. |
| 7,383,304 | B2 | 6/2008 | Shimada et al. |
| 2002/0032738 | A1 | 3/2002 | Foulger et al. |
| 2002/0066026 | A1 | 5/2002 | Yau et al. |
| 2002/0078158 | A1* | 6/2002 | Brown et al. ............ 709/206 |
| 2002/0107904 | A1 | 8/2002 | Talluri et al. |
| 2002/0120697 | A1 | 8/2002 | Generous et al. |
| 2002/0138735 | A1 | 9/2002 | Felt et al. |
| 2002/0169835 | A1 | 11/2002 | Paul et al. |
| 2002/0194341 | A1 | 12/2002 | Gupta |
| 2003/0037235 | A1 | 2/2003 | Aziz et al. |
| 2003/0222909 | A1 | 12/2003 | Long et al. |
| 2004/0006598 | A1 | 1/2004 | Bargagli Damm et al. |
| 2004/0028049 | A1 | 2/2004 | Wan |
| 2004/0205330 | A1 | 10/2004 | Godfrey et al. |
| 2005/0228864 | A1 | 10/2005 | Robertson |
| 2005/0267738 | A1 | 12/2005 | Wilkinson et al. |

OTHER PUBLICATIONS

Frak, Bodek, "Out of Office Lotus Notes 8 vs 7", vol. 22, Issue 1, Winter 2009 Edition, (4 pages).

Kadashevic et al., "Demystifying the Out of Office Agent", Nov. 2, 1998, http://www.ibm.com/developerworks/lotus/library/ls-Out_of_Office_agent/, date of access: May 5, 2012 (5 pages).

Kadashevich, Julie, "Lotus Notes Out of Office Agent, revisited: Part 1", Sep. 20, 2005, http://www.ibm.com/developerworks/lotus/library/000-pt1/, date of access: May 5, 2012, (10 pages).

Kadashevich, Julie, "The new IBM Lotus Notes 8 Out of Office functionality", Feb. 6, 2007, http://www.ibm.com/developerworks/lotus/library/notes8-ooo/, date of access: May 5, 2012 (6 pages).

U.S. Office Action issued in U.S. Appl. No. 11/159,101, mailed Aug. 15, 2012 (20 pages).

U.S. Office Action issued in U.S. Appl. No. 11/159,101, mailed Dec. 9, 2011 (19 pages).

U.S. Office Action issued in U.S. Appl. No. 11/159,101, mailed Jan. 6, 2009 (20 pages).

U.S. Office Action issued in U.S. Appl. No. 11/159,101, mailed Jan. 6, 2010 (14 pages).

U.S. Office Action issued in U.S. Appl. No. 11/159,101, mailed Jun. 11, 2009 (19 pages).

U.S. Office Action issued in U.S. Appl. No. 11/159,101, mailed May 31, 2011 (18 pages).

U.S. Office Action issued in U.S. Appl. No. 11/159,101, mailed Sep. 30, 2010 (18 pages).

U.S. Notice of Allowance for U.S. Appl. No. 11/159,101, dated Dec. 10, 2012, 9 pages.

* cited by examiner

AUTOMATED SELECTION AND INCLUSION OF A MESSAGE SIGNATURE

This is a continuation of application Ser. No. 11/159,101, filed Jun. 23, 2005, now U.S. Pat. No. 8,429,411 which claims priority to European Patent Application No. 05105515.0, filed Jun. 21, 2005, all of which are incorporated herein by reference.

FIELD OF THE INVENTION

This invention relates generally to messaging over a computer network, and specifically to the selection and addition of a personalized signature to a message for delivery over a computer network.

TECHNICAL BACKGROUND

Current client and server applications for the composition and delivery of electronic messages such as e-mail, peer-to-peer (P2P) messaging, short message service (SMS), and the like, allow users to define a text set that is automatically appended to the end of all messages sent from the user's communication device, whether a personal computer, handheld communication device, or the like. This automated signature may comprise the user's contact details, news items or announcements, or other information of interest to either the user or the recipient of the message.

For example, the user may define an automated signature cautioning the recipient of the confidential or privileged nature of the electronic communication. Alternatively, the automated signature may be defined to provide information about the type of encoding or encryption used in the message. As an example, if a message is signed using Secure Multipurpose Internet Mail Extension (S/MIME), the recipient will require a copy of the appropriate certificate in order to validate the digital S/MIME signature. Thus, the user may define an automated signature to read, "This message has been signed using S/MIME. If the signature appears to be invalid, you are probably missing my certificate authority's root certificate. Please contact me for information on how to download the root certificate."

In practice, because an automated signature is appended to every message composed by the user, the content of the automated signature may be inaccurate given the context of the electronic message. If the user is sending an e-mail message to an individual within the same organization, it may be unnecessary to include a confidentiality notice in the automated signature. Or, if the user is sending merely a plaintext message, and not a digitally signed message, an automated signature providing information about obtaining a certificate authority's root certificate is irrelevant. Currently, the only means by which a predefined automated signature may be edited are either by manually editing the signature text, once appended to the electronic message, or by selecting another user profile with differently defined automated signature text. These solutions are inconvenient or impracticable.

In the first case, the messaging application must allow the user to edit the automated signature text at the same time the message is composed. This requires that the user remember to edit the automated signature text after making a decision to digitally sign or encrypt the message (or after making a decision not to digitally sign or encrypt the message); this first case also presupposes that the signature will be appended to the message at the user's communication device. If the messaging system is configured to append the automated signature to the message after the message is received by a message server, the user will not have an opportunity to edit the signature. In the second case, while some messaging applications may support multiple profiles for a single user, the user must remember to select the appropriate profile prior to composing the message.

Alternatively, the automated signature text may be defined to address all possible contingencies (for example, the text may read "This message may have been signed . . . " instead of "This message has been signed . . . "), but this may result in an inefficient use of resources, particularly if none of the contingencies apply to the message at hand. For example, if the message sent is merely a plaintext message without a digital signature or encryption, then any information provided about encoding or certificates would be superfluous; the size of the automated signature may even be larger than the content of the message itself.

Accordingly, it is desirable to provide a system and method for the automated selection and inclusion of automated signature text in an electronic message appropriate for the encoding method and/or recipient of the message. It is furthermore desirable to provide a system and method for defining automated signature text for use for different encoding methods or for classes of recipients.

BRIEF DESCRIPTION OF THE DRAWINGS

In drawings which illustrate by way of example only a preferred embodiment of the invention.

DETAILED DESCRIPTION OF THE PREFERRED EMBODIMENT

Figure 1:
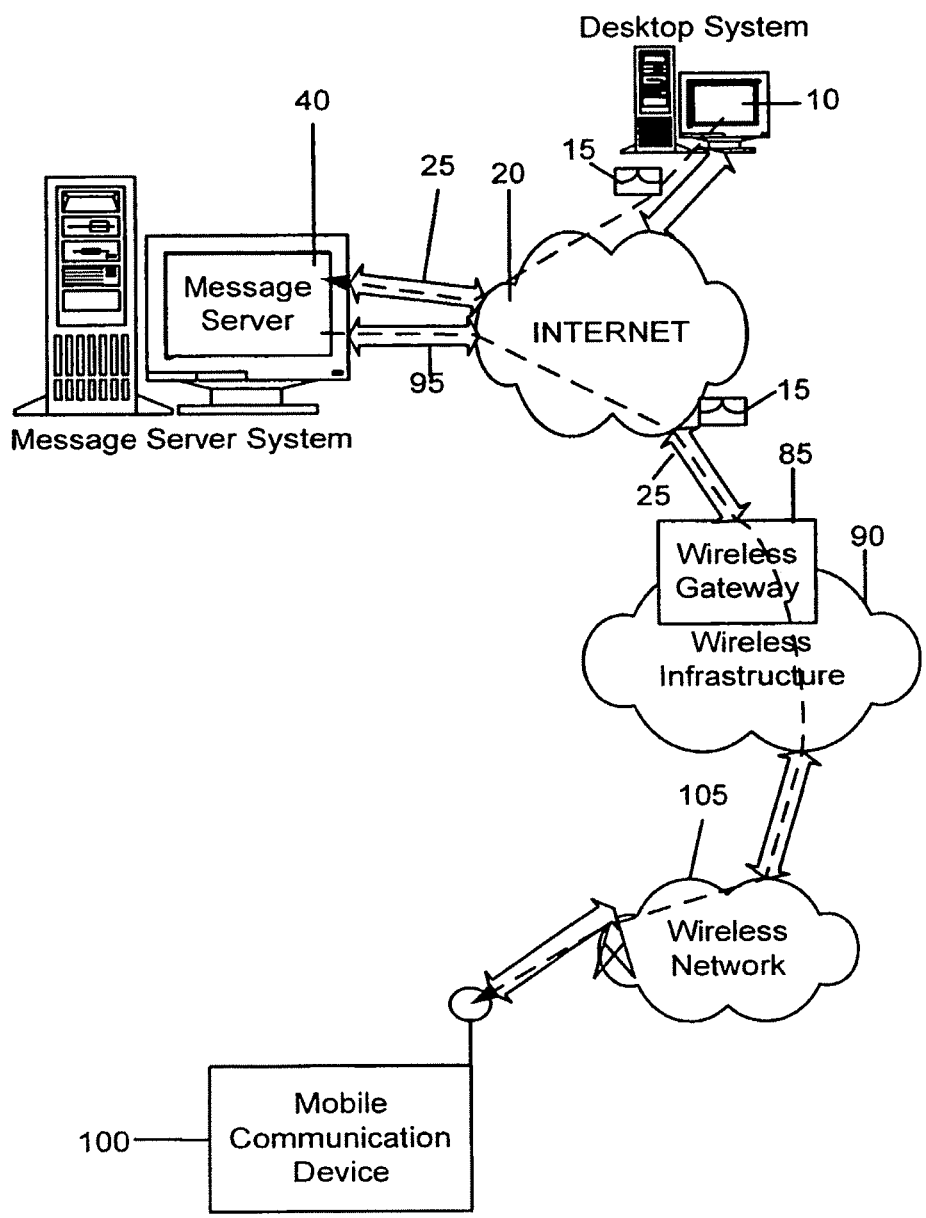
FIG. 1 is a block diagram of a network topology employing the system and method for automated selection and inclusion of automated signature text in an electronic message.

Accordingly, a system is provided for composing an electronic message for delivery from a sender to at least one recipient, comprising a messaging application for associating at least one of a plurality of automated signature texts with at least one attribute associated with the electronic message or the at least one recipient, composing an electronic message, selecting an encoding type for an electronic message from a plurality of encoding types, automatically selecting at least one of a plurality of automated signature texts that is associated with at least one attribute associated with the electronic message or the at least one recipient, inserting the at least one selected automated signature texts into the electronic message, and encoding the electronic message according to the encoding type selected for the message.

In an embodiment, the at least one attribute associated with the electronic message or the recipient comprises at least one of the following: the selected encoding type, a message transport method selected for delivering the electronic message, or address book field data associated with the at least one recipient. Further, the messaging application is further configured to compare the address book field data associated with the at least one recipient with a predetermined value, and to select a first automated signature text upon a match of the address book field data with the predetermined value, and a second automated signature text upon a mismatch of the address book field data with the predetermined value. In a further embodiment, where the electronic message is composed for delivery to a plurality of recipients, and a plurality of attributes is associated with the plurality of recipients, the plurality of attributes is ranked in a hierarchical manner such that the automated signature text that is associated with the highest-ranking attribute associated with the plurality of recipients is selected.

In another embodiment, a method for automated selection and inclusion of one of a plurality of automated signature texts in an electronic message is provided, the method comprising the steps of associating at least one of a plurality of automated signature texts with at least one attribute associated with the electronic message or a recipient of the electronic message; selecting an encoding type for the electronic message; automatically selecting at least one of a plurality of automated signature texts that is associated with at least one attribute associated with the electronic message or a recipient of the electronic message; inserting the selected at least one automated signature text into the electronic message; and encoding the electronic message according to the encoding type selected for the message. In a further embodiment, the method further comprises the steps of composing and transmitting the electronic message.

In a further embodiment, the step of transmitting the encoded message is the step of transmitting the encoded message to a message server, the step of inserting the selected at least one automated signature text into the electronic message takes place at the message server, and the step of automatically selecting at least one of a plurality of automated signature texts comprises either the step of comparing an attribute associated with the electronic message or a recipient of the electronic message a predetermined value, and selecting a first automated signature text upon a match of the attribute with the predetermined value, and a second automated signature text upon a mismatch of the attribute with the predetermined value; or the step of comparing the address book field data associated with a recipient with corresponding data associated with a sender of the electronic message, and selecting a first automated signature text upon a match of the address book field data with the corresponding data, and a second automated signature text upon a mismatch of the address book field data with the corresponding data. The step of automatically selecting at least one of a plurality of automated signature texts may also comprise the step of selecting an automated signature text that is associated with the selected encoding type.

In yet a further embodiment, a mobile communication device or a computer program product is provided that is operative to execute the above method.

Referring to FIG. 1, a simplified exemplary network topology supporting an embodiment of the system and method. One skilled in the art will appreciate that there may be hundreds of different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment.

FIG. 1 shows a message sender system 10 for use by a message sender, the Internet 20, a message server system 40, a wireless gateway 85, wireless infrastructure 90, a wireless network 105 and a mobile communication device 100. The message sender system 10 may be a personal computer or other communication device, and may in fact comprise a mobile communication device as well. Either the message sender system 10 or the mobile communication device 100, or preferably both, are configured to send at least one of e-mail messages, short message service (SMS), peer-to-peer (P2P) messages, or other electronic messages, and preferably configured to encrypt and digitally sign messages in accordance with Secure Multipurpose Internet Mail Extension (S/MIME) or other protocols.

The message sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail and other message exchange over the Internet 20. Although other messaging systems might not require a message server system 40, a mobile communication device 100 configured for receiving and possibly sending e-mail and other messages will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile communication device 100. The particular network 105 may be virtually any wireless network over which messages may be exchanged with a mobile communication device.

As shown in FIG. 1, a composed electronic message, such as an e-mail message 15, is sent by the message sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile communication device 100 must request that stored messages be forwarded by the message server to the mobile device 100. Some systems provide for automatic routing of such messages which are addressed using a specific e-mail address associated with the mobile communication device 100. In a preferred embodiment described in further detail below, messages addressed to a message server account associated with a host system such as a home computer or office computer which belongs to the user of a mobile communication device 100 are redirected from the message server 40 to the mobile communication device 100 as they are received.

The messaging application resident on either the sender system 10 or the mobile communication device 100 may be configured to allow the user to create automated signature text for inclusion with e-mail or other text messages. In the prior art, the messaging application provides the user with the capability of creating a single automated signature text file for a single user profile, and the capability of selecting whether that automated signature text is to be included automatically, without editing, with every message composed using the messaging application. The messaging application in the prior art may further provide the user with the capability of creating multiple automated signature text files; however, the inclusion of any automated signature text other than an automated signature designated as the default requires the manual intervention of the user at the time the e-mail message is composed. In the prior art system, the message server 40 may be configured to synchronize its automated signature entry for the user of the sender system 10 or the mobile communication device 100, so that the same automated signature text, composed by the user, is stored both locally on the sender system 10 and the mobile communication device 100, as well as on the message server 40. The message server 40 may further be configured to automatically append the synchronized automated signature text to messages sent from the sender system 10 or the mobile communication device 100.

However, as noted above, the prior art system is not capable of distinguishing between the relevance of an automated signature to the recipient and/or encoding of a message. Accordingly, an embodiment provides a system and method for automatically selecting and including a defined automated signature according to the encoding type used for the message and/or the class of recipient.

Figure 5:
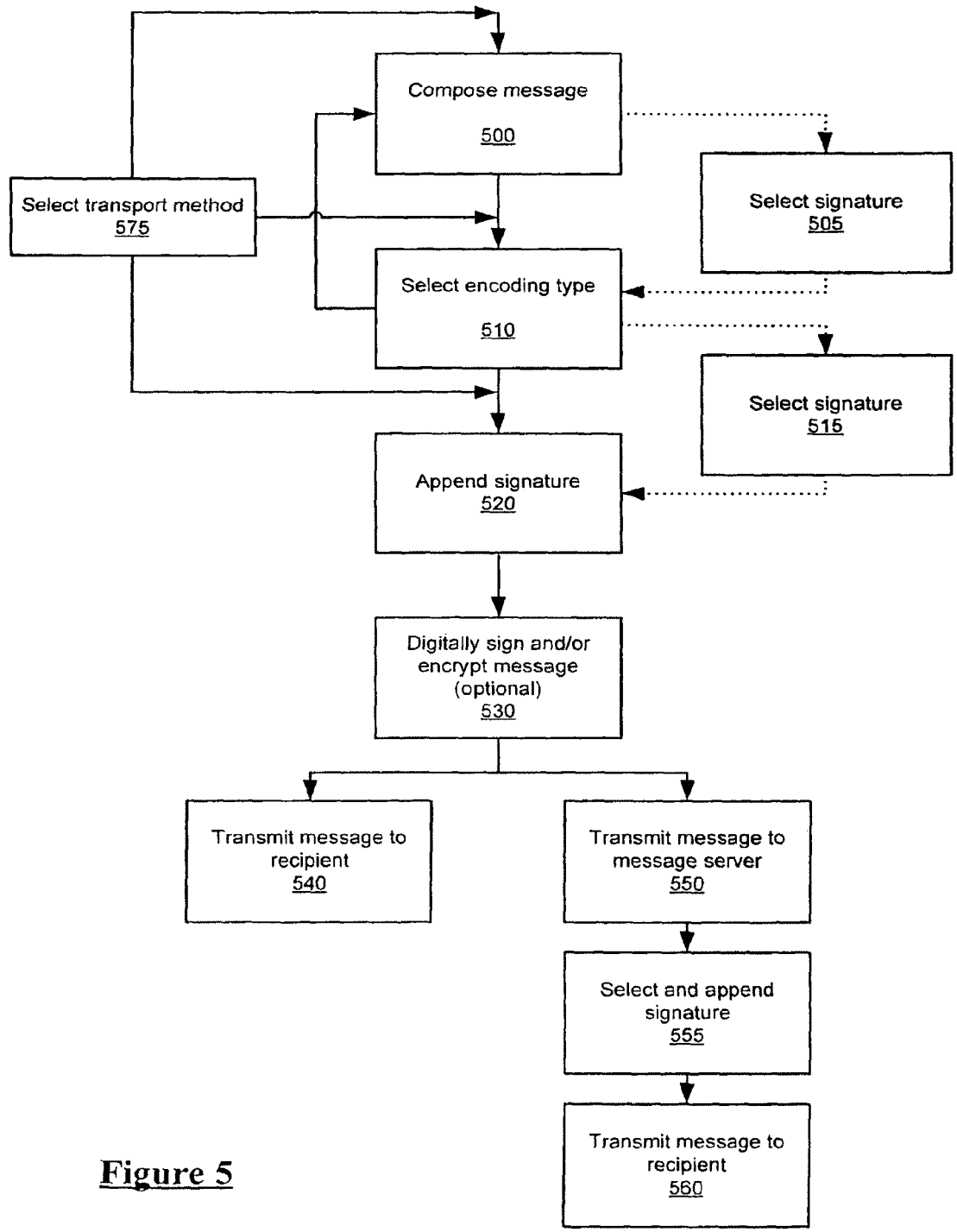
FIG. 5 is a flow chart of a method for automated selection and inclusion of automated signature text in an electronic message.

Referring to FIG. 5, a method for automatically selecting and including one of a multiple of automated signatures is shown. At step 500, the user of the sender system 10 or the mobile communication device 100 invokes the messaging application resident on the system 10 or device 100 to compose a message. The message content is entered by the user in a manner generally known in the art, using an input device such as a keyboard, tablet, or other means. Message composition may include the designation of one or more recipients of the message, which may be selected from a personal address book resident on the sender system 10 or mobile communication device 100, or entered directly by the user, as well as the entry of message content and the selection and addition of files as attachments, as well as other activities known in the art. Message composition may also include the editing of a pre-existing message that has not yet been transmitted.

After the message is composed, or during message composition, the user selects an encoding type 510. Common encoding types include plaintext, S/MIME signed, S/MIME encrypted, or S/MIME signed and encrypted. One of these encoding types may be set as a default encoding type for all messages composed using the messaging application, in which case if the user wishes to use the default encoding type, step 510 is accomplished without any user intervention and is effectively executed prior to or during message composition. Either during composition 500 or after selection of an encoding type 510, but in any event prior to inserting a signature 520, signing or encrypting the message 530, or transmitting the message 540, the predetermined automated signature text is automatically selected by the mobile communication device 100 or the sender system 10 according to predetermined criteria as described below. In one embodiment, the selection step 505 comprises the storage of the automated signature text in a designated memory location based on the currently selected encoding type, although other predetermined criteria may be used. If the encoding type or the other predetermined criteria change during the course of message composition, the selection of the automated signature text is updated at step 505 again. Most preferably, however, the automated signature text is selected at step 515 only after the steps of message composition 500, selection of transport method 575, and selection of encoding type 510 are complete, and the message is otherwise ready for encryption or signing (optional) and transmission. Once the automated signature text is selected at step 515, it is included with the message 520 prior to digitally signing and/or encrypting the message (including the automated signature text) 530. Preferably, the messaging application is configured to insert the selected automated signature text at the end of the content created by the user during the composition step 500, but before any content comprising a parent message that is quoted within the body of the message (for example, when the message is created in reply to, or in order to forward, a previously received message).

In this preferred embodiment, the selection of the automated signature text is triggered by the transmission of a "send" instruction or similar command to the messaging application by the user. The "send" command is invoked typically by selecting a "send" command in the messaging application. Upon receipt of the "send" instruction, prior to transmitting the message from the sender system 10 or the mobile communication device 100, the messaging application selects 515 and inserts 520 the appropriate automated signature text based on predetermined criteria such as the selected encoding type, then encodes the message 530 in accordance with the encoding type selected at step 510, which may include digitally signing and/or encrypting the message. Once encoded, the message may then be transmitted to the message server 40 for routing to the appropriate destination. In an alternate embodiment, the selection of the encoding type 510 may be made after the transmission of a "send" command by the user, but still before the selection of a signature at step 515.

In a further embodiment, the automated selection of the signature text is carried out at step 555, after transmission of the message to the message server 40, but before transmission of the message to the recipient at step 560. In this further embodiment, the message server 40 is configured to synchronize with the messaging application resident on the sender system 10 or the mobile communication device 100 so that it is capable of automatically selecting and appending automated signature text in accordance with the predetermined criteria described below. It will be appreciated that the step of selecting and appending automated signature text 555 may optionally be carried out by the message server 40 rather than by the sender system 10 or the mobile communication device 100 only in circumstances where the message to be transmitted is routed through the message server 40; for example, a mobile communication device 100 may be configured to deliver SMS or P2P messages that are not routed through the message server 40 at all, but rather using other means. In such circumstances, any selection of automated signature text is carried out at step 505 or 515 instead.

As noted above, the selection of the automated signature text may be made with reference to the selected encoding type. The messaging application or the message server 40 may further or alternatively be configured to select and include a predefined automated signature text based on a comparison of attributes associated with the designated recipients with predetermined values. For example, for each recipient designated for a message, the messaging application may be configured to query a personal address book or a global address book resident on either the mobile communication device 100 or the sender system 10 for an entry corresponding to that recipient and compare other fields in that corresponding entry against predetermined values. For example, at step 505 or 515, if a recipient's e-mail address or name is located in a personal or global address book, then the value of another field in the address book entry, such as company name, may be compared against a set of predetermined company name values; a predetermined signature is then selected according to whether a match in the set of predetermined values is found. Alternatively, if the address book supports the designation of categories of contacts (for example, user- or system-designated categories such as "supplier", "customer", or "personal"), predetermined automated signatures may be assigned to different categories. Thus, at step 505 or 515, the messaging application looks up the recipient's name or e-mail address in the address book; if the recipient is not found, or no categories are assigned to the recipient, then a first predetermined automated signature is included in the message. If the recipient is listed in the address book and a category is assigned to that recipient, then the messaging application selects and includes the predetermined automated signature associated with that category. As another example, if the recipient is known to be located in a specific country, automated signature text may be selected at step 505 or 515 to include useful information for that recipient, such as a toll-free number that functions in the recipient's country. In yet another embodiment, the predetermined criteria may be based on a comparison of the recipient's attributes with the sender's attributes; for example, if it is determined that both the recipient and the sender are located within time zones, the selected automated signature text may include information about the sender's business hours, adjusted for the time zone difference for the recipient. Or, if the messaging application or message server 40 determines that the sender system 10 or mobile communication device 100, or the user sending the message, and all recipients are located within the same domain (for example, the addresses of all parties to the message are @samecompany.com), the messaging application or message server 40 will select and include a first predefined automated signature text, but if at least one of the recipients is located in a domain external to the sender system 10, mobile communication device 100, or user sending the message, then the messaging application or message server 40 will select and include a second predefined automated signature text.

Further, S/MIME signed messages in accordance with step 530 may be either opaque-signed, in which case the entire message is S/MIME encoded, or clear-signed, meaning that the content of the message, including the automated signature, will be transmitted in plaintext, while the digital signature is included with the message as an attachment. All messages encoded at step 530 are referred to as "encoded" messages, whether opaque- or clear-signed. It will be appreciated that in systems where the message server 40 is configured to select and append automated signature text at step 555, the message is likely being transmitted in the clear (i.e., in plaintext) to the recipient.

In a further embodiment, the user of the sender system 10 or mobile communication device 100 may select an alternate messaging transport, such as SMS or P2P messaging. As shown in FIG. 5, the selection of the message transport 575 may be made via the messaging application on the system 10 or device 100 prior to the composition of the message 500; after the composition of the message, but before an encoding type is selected 510; or after the encoding type is selected, but before the automated signature text is added 520. In the case of P2P messaging, after step 530 is executed, rather than transmit the encoded message to the message server 40, the encoded message is transmitted directly to the recipient.

As described above, the messaging application or message server 40 is configured to select and insert an automated signature text based upon attributes of either the message itself (such as the encoding type or the transport method), the attributes of the recipient as compared to predetermined values (such as the geographic location, company affiliation, or category), or the attributes of the recipient as compared to the attributes of the sender (such as whether both are located in the same time zone or geographic area, or whether both have e-mail addresses in the same domain). Described below is an embodiment of the user interface for use with the messaging application on the sender system 10 or the mobile communication device 100 to provide for creation of multiple automated signatures for use with different encoding types, or other attributes. If the message server 40 is configured to select and append signatures in accordance with the embodiments described above, then the message server 40 may itself be provided with the user interface described below, or alternatively the message server 40 may be configured to synchronize its settings to match the criteria and multiple automated signatures defined on the mobile communication device 100 or sender system 10, or vice versa.

Figure 2:
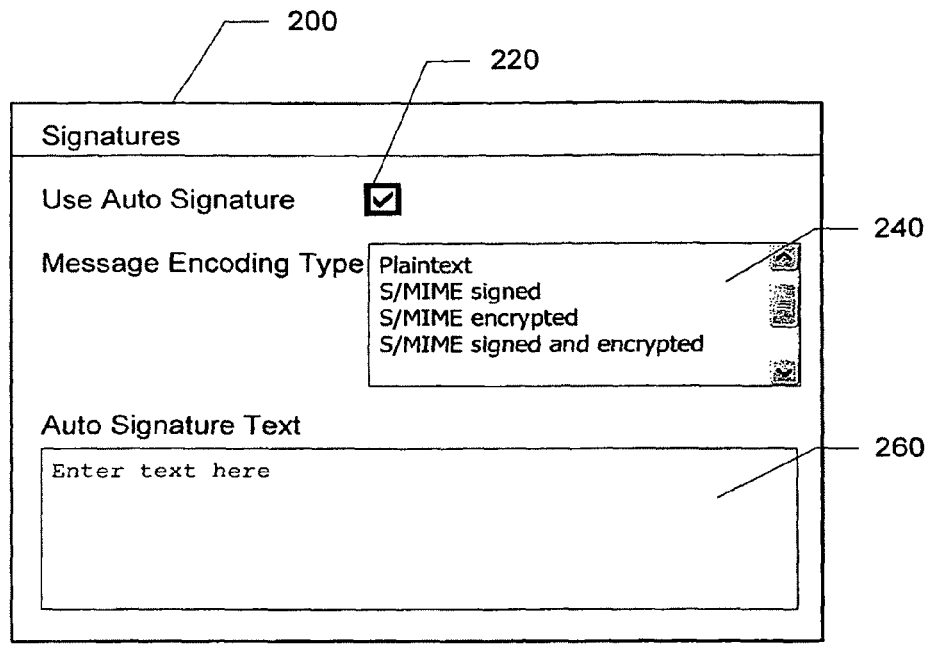
FIG. 2 is a block diagram of a graphical user interface for use with the system and method of for automated selection and inclusion of automated signature text in an electronic message.

Referring to FIG. 2, a dialog box 200 for use in the messaging application is shown. This dialog box 200 is displayed when the user selects the appropriate instruction from the messaging application user interface, or inputs a direct command in order to begin editing the automated signature text. Persons skilled in the art will appreciate that the dialog box 200 may take any form suitable for the messaging application implemented on a sender system 10 or mobile communication device 100; the interface is not restricted to the embodiment depicted herein. For example, where checkboxes and drop-down lists are provided to allow a user to select an option, radio buttons or other selection means may be implemented.

The dialog box 200 presents the user with a global "Use Auto Signature" option 220. As shown in FIG. 2, this option is selected. Deselecting this option would result in no automated signature being inserted into any message sent from the sender system 10 or mobile communication device 100.

Figure 2A:
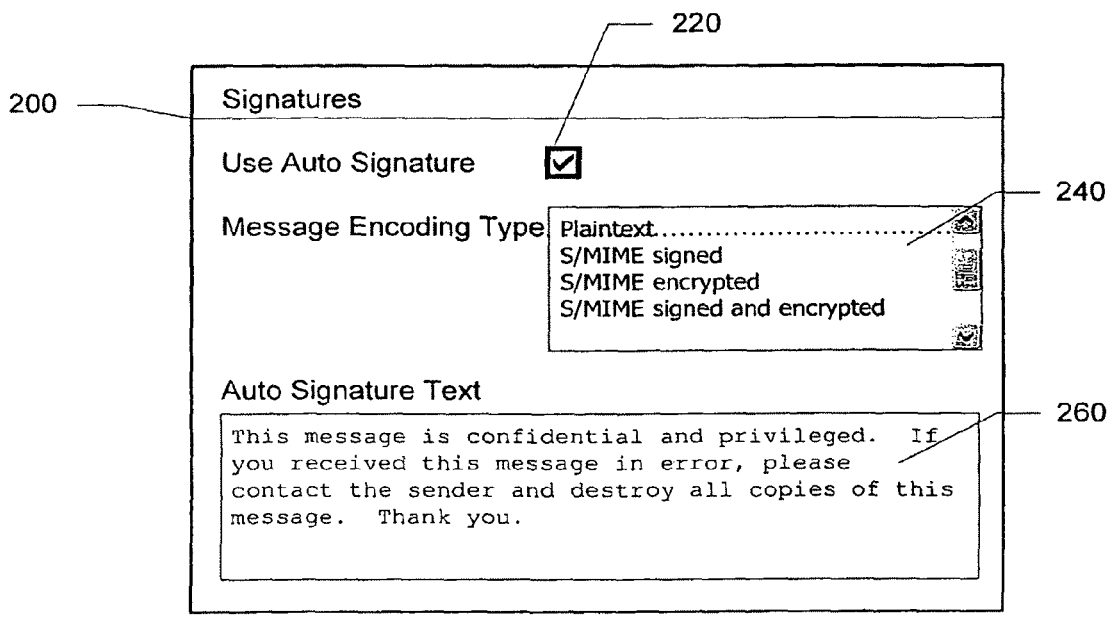
FIG. 2a is a further embodiment of the graphical user interface of FIG. 2 for use in creating automated signature content for a plaintext message.
Figure 2B:
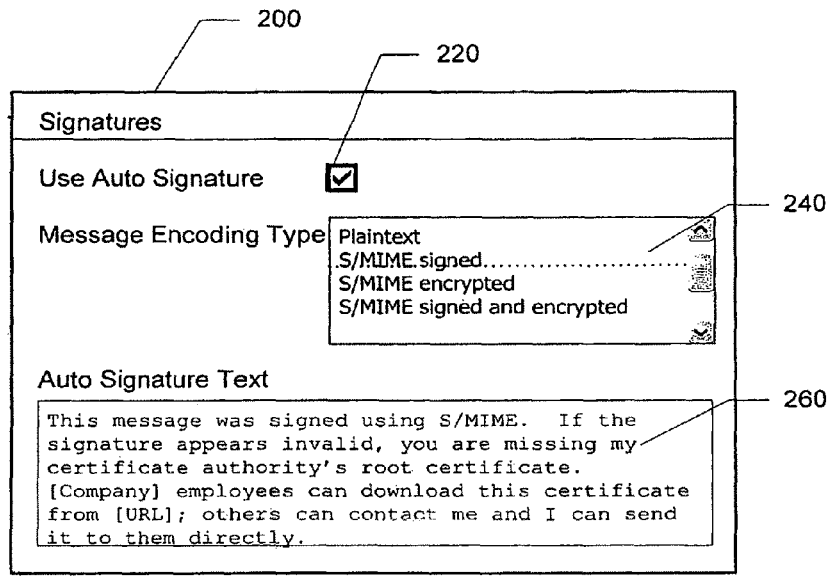
FIG. 2b is a further embodiment of the graphical user interface of FIG. 2 for use in creating automated signature content for a S/MIME signed message.

A drop-down list of encoding types available in the messaging application 240 is provided. Selection of an entry in the drop-down list 240 activates a text entry field 260, also preferably provided in the dialog box 200. The text entry field 260 is associated with the selected entry of the drop-down list 240, as can be seen in FIG. 2a. In FIG. 2a, the "plaintext" encoding type is selected, and the content of text entry field 260 is thus associated with the plaintext encoding type. The user may then enter the desired automated signature text in the text entry field 260, and the input text is saved by the messaging application. Further, as shown in FIG. 2b, when the "S/MIME signed" encoding type is selected, the content of the text entry field 260 is then associated with the S/MIME signed encoding type, and the content of the field 260 may be different from the text saved in association with plaintext messages.

Figure 2C:
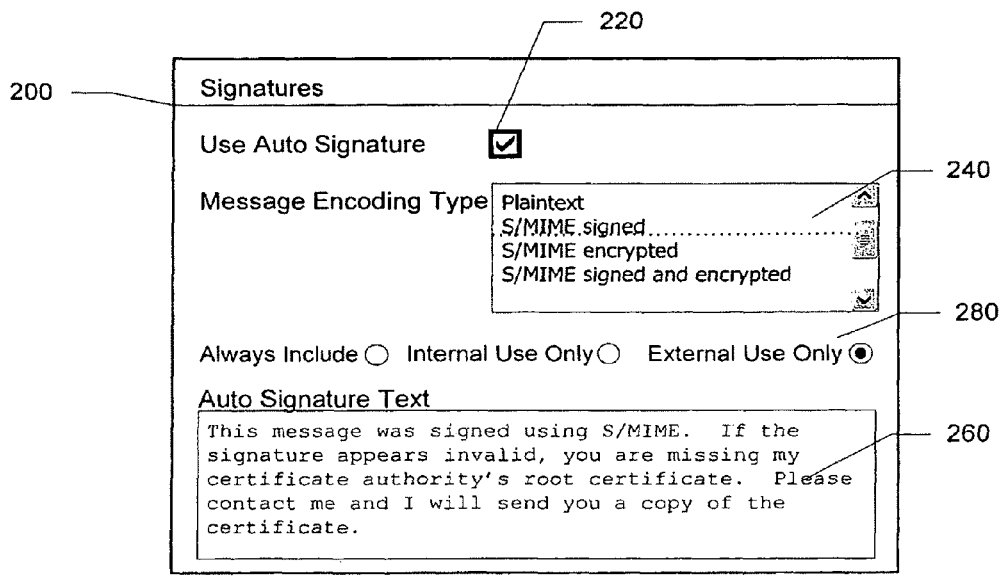
FIG. 2c is a further embodiment of the graphical user interface of FIG. 2 for use in creating automated signature content for a S/MIME signed message based on the recipient's domain.

In a further embodiment, as shown in FIG. 2c, automated signature text is also configured based on the relationship of the recipient to the sender. Radio buttons 280 allow the user to designate whether automated signature text is to be inserted into messages addressed to all recipients, "internal" recipients (for example, recipients located within the same domain), or "external" recipients. Thus, for example, the user may further customize the automated signature text to provide a set of text that is associated with external recipients of S/MIME signed messages (as shown in FIG. 2c), internal recipients of S/MIME signed messages, or alternatively if the "Always Include" radio button is selected, then the content of the text field 260 will be included in S/MIME signed messages regardless of whether the recipient is in the same domain as the sender. Thus, by allowing for the configuration of multiple automated signature texts, and the selection and inclusion of one of the multiple of automated signature texts by the messaging application, the incidence of the inclusion of redundant or irrelevant information in the automated signature is reduced. As will be appreciated from the foregoing description, the messaging application treats the various automated signature texts in a hierarchical manner, which in the above embodiment treats the "internal" automated signature as subordinate to the "external" automated signature, which in turn is subordinate to the "always include" signature. The lowest level automated signature is selected by the messaging application unless at least one recipient of a message is determined to be an "external" recipient, or unless an "always include" automated signature is available. In a further embodiment, the "always include" automated signature does not override the use of the "external" or "internal" automated signatures, but is always included in addition to the "external" or "internal" automated signature.

Figure 3:
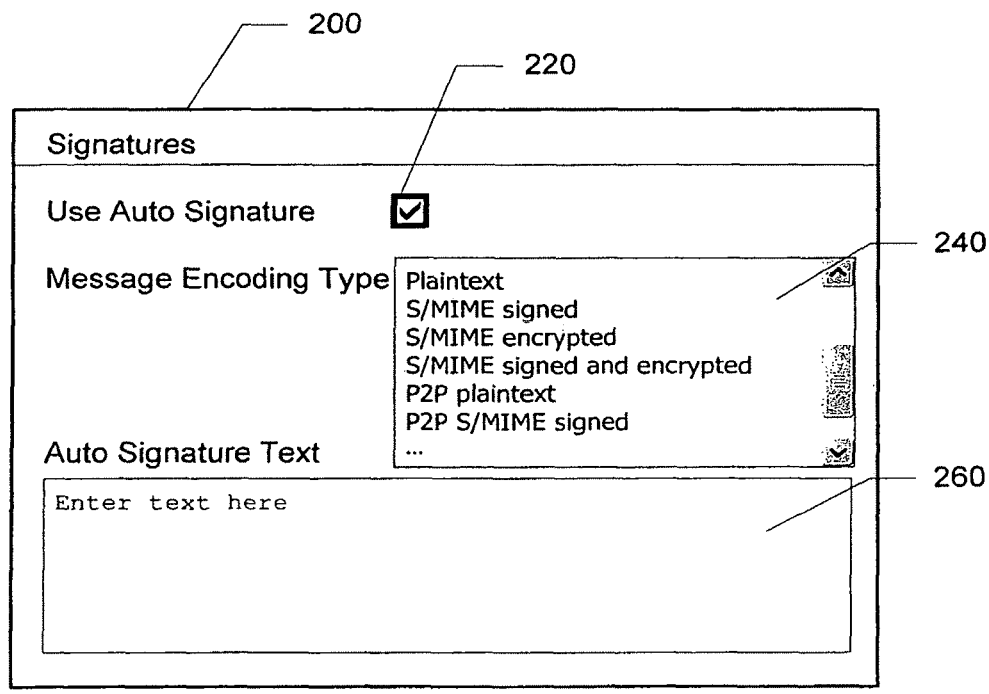
FIG. 3 is a further embodiment of the graphical user interface of FIG. 2 further configured for use with P2P messaging.

In a further embodiment, the dialog box 200 is configured to allow the user to configure automated signature texts for use in association with messages sent using different transport methods, such as P2P messaging, as shown in FIG. 3. Preferably, due to the typically brief length of P2P messages, a signature is not included with plaintext P2P messages in order to reduce the length of the message; accordingly, the text field 260 associated with a plaintext P2P message would be preferably disabled so that no automated signature text is associated with that particular encoding and transport method. However, it may still be desirable to transmit information about certificate availability with a digitally signed or encrypted P2P message; accordingly, the text fields 260 associated with those encoding/transport methods may be enabled.

Figure 4:
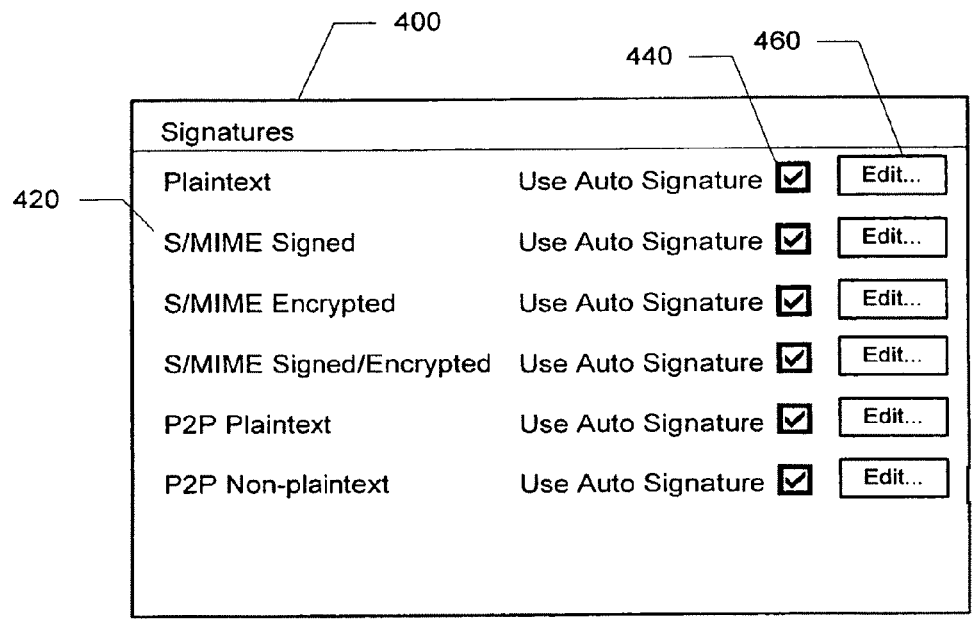
FIG. 4 is a further embodiment of the graphical user interface of FIG. 2.
Figure 4A:
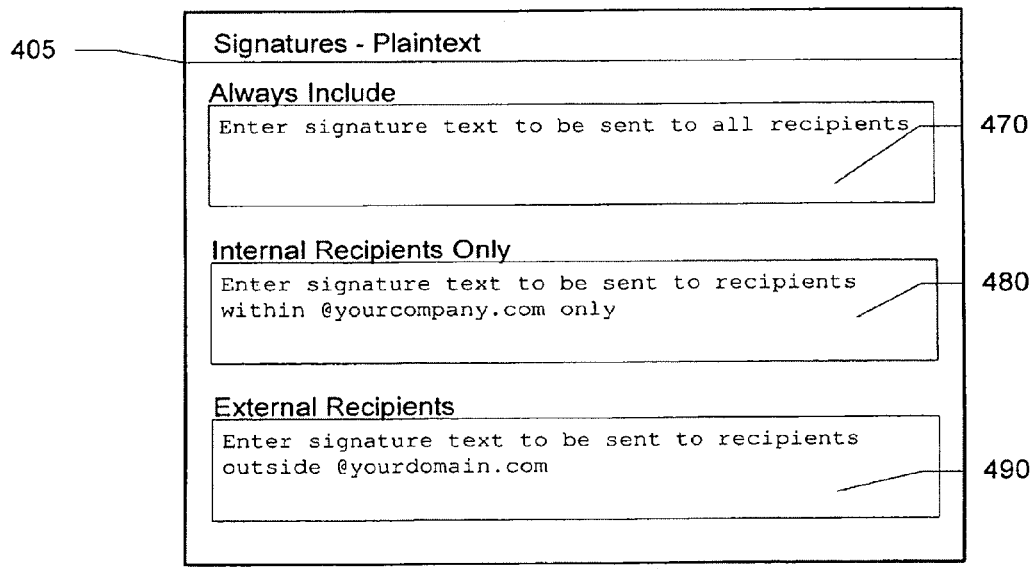
FIG. 4a is a further embodiment of the graphical user interface of FIG. 2.

The user interface and messaging application may alternatively be structured such that the domain of the recipient relative to that of the sender overrides all other options. Referring to FIG. 4, an alternative graphical user interface is shown. Dialog box 400 now comprises a series of "Use Auto Signature" checkboxes 440 to correspond to the series of encoding and/or transport options 420. Each encoding and/or transport option 420 is further associated with an automated signature text, or a plurality of automated signature texts, as shown in the child dialog box 405 of FIG. 4a. In particular, the embodiment of FIG. 4a provides alternative automated signature text files for a message, for use with all recipients 470, internal recipients (i.e. within the same domain as the sender) 480, or external recipients 490. Thus, if a message is addressed to at least one external recipient, then the messaging application will select and include the automated signature text for external recipients 490. If a message is addressed only to internal recipients, then the messaging application will select and include the automated signature text for internal recipients 480. If automated signature text 470 is stored for use with all recipients, then this text 470 may be included in the e-mail message in place of, or in addition to, the text of the appropriate automated signature 480 or 490. The text entry fields for each of these automated signature texts 470, 480, and 490 is accessible via the user interface by clicking on the "Edit . . . " button provided in the dialog box 400, which then invokes the appropriate child dialog box 405.

Figure 4B:
FIG. 4b is a further embodiment of the graphical user interface of FIG. 2.

Optionally, as shown in FIG. 4b, an embodiment may also provide means to assign a particular automated signature text file to categories of recipients. Recipients are preferably assigned to categories as the recipient contact information is entered into a personal address book or global address book resident on the mobile communication device 100 or sender system 10, or after the recipient contact information has been entered into the address book. The user interface 405 may thus provide a selection tool 492 for each category present in the address book, so that the user may select a category and assign, using the radio buttons 494 or some other suitable selection tool, one of the three automated signature text files 470, 480, or 490 to that category. The messaging application, as described in relation to FIG. 4a, above, may also treat the selection and inclusion of an automated signature in a hierarchical manner at step 520; thus, for example, if all the recipients are members of categories to which the "internal" automated signature text 480 is assigned, then the messaging application will select and include the "internal" automated signature text 480; if one of the recipients of a message is a member of a category to which the "external" automated signature 490 is assigned, then the messaging application will select and include the "external" automated signature 490 to the message; and if automated signature text 470 for inclusion with every message is provided, then this "always include" automated signature text 470 overrides the other signatures, or alternatively is included as well as the other signature selected by the messaging application. If the messaging application is configured to include more than one signature to the message, then the radio buttons 494 may be replaced with checkboxes. Similar interfaces 405 may be presented to the user to define automated signature texts for S/MIME signed, S/MIME encrypted, S/MIME signed and encrypted, P2P plaintext, and P2P S/MIME signed messages as well as for any other message types that may be defined for use by the messaging application.

Figure 4C:
FIG. 4c is a further embodiment of the graphical user interface of FIG. 2.

Alternatively, each category may be assigned its own automated signature text. FIG. 4c shows an interface 405 for a simple implementation of this embodiment, in which only three categories are available in the address book; it will be appreciated that this embodiment may comprise further categories to be included in the selection tool 496 and further automated signature texts to be configured besides texts 497, 498, and 499. In this embodiment, the messaging application at step 520 will determine which automated signature text to include by comparing the recipients listed in the message against the entries in the personal or global address book. If the recipient is not found, or no categories are assigned to the recipient, then the messaging application may select and include a default automated signature text, such as the "always include" or "external" automated signature. If the recipient is listed in the address book and a category is assigned to that recipient, then the messaging application selects and includes the predetermined automated signature associated with that category. If the message designates a plurality of recipients wherein at least one recipient is not listed in the address book, or is not associated with a category, then the messaging application may select and include the default automated signature text, as described above. If the message designates a plurality of recipients belonging to more than one category, then the messaging application selects and includes the appropriate automate signature text based on a hierarchy. In the example shown in FIG. 4c, the "supplier" category overrides the "customer" category, so if the messaging application determines that one recipient of a particular message is a "supplier" while another recipient is a "customer", the messaging application will select and include the "supplier" automated signature text 497.

Figure 4D:
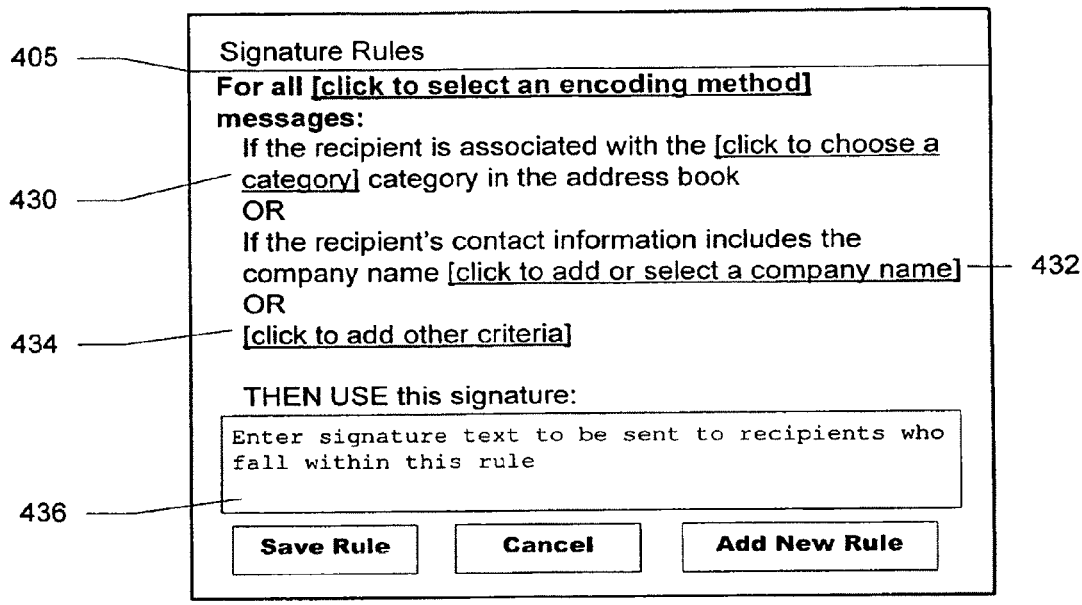
FIG. 4d is a further embodiment of the graphical user interface of FIG. 2.
Figure 4E:
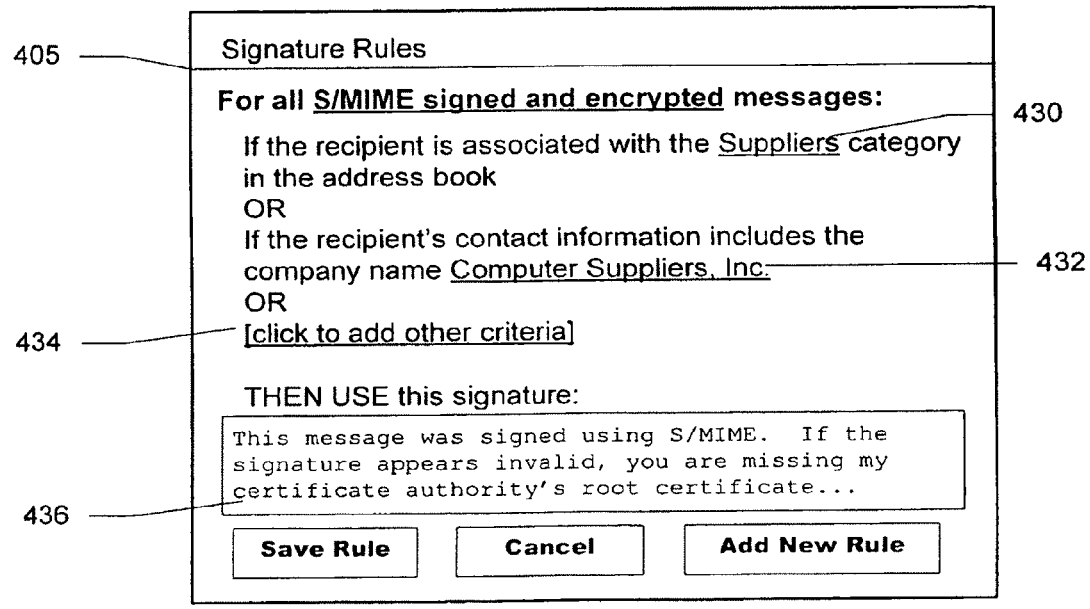
FIG. 4e is an implementation of the embodiment of the graphical user interface of FIG. 4d.

In a further embodiment, as shown in FIGS. 4d and 4e, the messaging application selects and includes automated signature text based on a series of rules preferably defined by the user or a system administrator. In the interface shown in FIG. 4d, the user or administrator is provided with the options of configuring automated signature text 436 for use with messages using a predetermined encoding method, which are addressed to recipients in a selected category or categories 430, or to recipients who are associated in an address book with a particular company name 432, or other criteria that may be determined by the user or administrator. Thus, in FIG. 4e, an implementation of this embodiment is shown in which the automated signature text 436 has been defined for use with S/MIME signed and encrypted messages that are addressed either to recipients associated with a "Suppliers" category or with the company name "Computer Suppliers, Inc."

It will be understood that the options and automated signature text entered via the dialog box 200 or 405 will be stored by the messaging application on the sender system 10 or the mobile communication device 100, and preferably uploaded to the message server 40 at an available opportunity. Preferably, however, the signatures would be inserted into the electronic message at the sender system 10 or mobile communication device 100, particularly for those messages that are S/MIME signed and/or encrypted. However, for plaintext messages that do not require digital authentication or encryption, it is possible to configure the message server 40 to insert a plaintext signature to outbound messages in accordance with the preferred embodiments. Further, in another embodiment, the user interface and messaging application may be configured to address automated signatures for use in SMS, although it may be preferable to disable automated signature selection for SMS messages.

Referring again to FIG. 1, regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Various embodiments of the present invention having been thus described in detail by way of example, it will be apparent to those skilled in the art that variations and modifications may be made without departing from the invention. The invention includes all such variations and modifications as fall within the scope of the appended claims. For example, a computer program product may be provided with code operative to carry out the methods described herein. Further, the computer program product may comprise a computer usable medium having computer readable program code embodied therein for executing the methods described herein.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

We claim:

1. A method of facilitating communication of electronic messages, the method comprising:
    enabling, via a user interface, configuration of a first message and a second message, the user interface indicating the first message being configured to be sent as at least a portion of an automatic reply electronic message in reply to an electronic message received from a source internal to a particular organization and the second message being configured to be sent as at least a portion of an automatic reply electronic message in reply to an electronic message received from a source external to the particular organization;
    enabling, via the user interface, modification of at least one of the first message or the second message; and
    transmitting the configuration to an electronic message server.

2. The method of claim 1, further comprising:
    enabling, via the user interface, configuration of a third message, the user interface indicating the third message being configured to be sent as at least a portion of an automatic reply electronic message in reply to both an electronic message received from a source internal to the particular organization and a electronic message received from a source external to the particular organization.

3. The method of claim 1, wherein the particular organization represents a class, wherein users internal to the particular organization are included in the class, and wherein users external to the organization are not included in the class.

4. The method of claim 3, wherein the class of a user is indicated by associated information stored in an address book.

5. The method of claim 1, wherein the particular organization represents a category, wherein users internal to the particular organization are included in the category and wherein users external to the particular organization are not included in the category.

6. The method of claim 5, wherein the category is one of personal, customer, and supplier.

7. The method of claim 4, wherein the category of a user is indicated by associated information stored in an address book.

8. The method of claim 1, further comprising:
enabling, via the user interface, selection from among a set of electronic message conditions associated with one or more of the messages.

9. The method of claim 8, wherein the configuration includes one or more of the selected electronic message conditions for the first message or the second message.

10. The method of claim 1, wherein the server comprises an associated message server.

11. The method of claim 10, further comprising:
receiving, by the associated message server, the configuration;
transmitting, by the associated message server, automatic reply electronic messages in accordance with the configuration.

12. The method of claim 1, wherein a source's relationship to the particular organization, internal to the particular organization or external to the particular organization, is reflected in at least a part of an address portion of electronic messages sent by or on behalf of the source.

13. The method of claim 1, further comprising:
receiving an email message from a particular source; and
determining whether the particular source is considered to be internal to the particular organization or external to the particular organization based on at least a part of an address portion of electronic messages sent by or on behalf of the source.

14. A message communication device configured to:
enable, via a user interface, configuration of a first message and a second message, the user interface indicating the first message being configured to be sent as at least a portion of an automatic reply electronic message in reply to an electronic message received from a source internal to a particular organization and the second message being configured to be sent as at least a portion of an automatic reply electronic message in reply to an electronic message received from a source external to the particular organization;
enable, via the user interface, modification of at least one of the first message or the second message; and
transmit the configuration to an electronic message server.

15. The device of claim 14, further configured to:
enable, via the user interface, configuration of a third message, the user interface indicating the third message being configured to be sent as at least a portion of an automatic reply electronic message in reply to both an electronic message received from a source internal to the particular organization and a electronic message received from a source external to the particular organization.

16. The device of claim 14, wherein the particular organization represents a class, wherein users internal to the particular organization are included in the class, and wherein users external to the organization are not included in the class.

17. The device of claim 16, wherein the class of a user is indicated by associated information stored in an address book.

18. The device of claim 14, wherein the particular organization represents a category, wherein users internal to the particular organization are included in the category, and wherein users external to the particular organization are not included in the category.

19. The device of claim 18, wherein the category is one of personal, customer, and supplier.

20. The device of claim 17, wherein the category of a user is indicated by associated information stored in an address book.

21. The device of claim 1, further configured to:
enable, via the user interface, selection from among a set of electronic message conditions associated with one or more of the messages.

22. The device of claim 21, wherein the configuration includes one or more of the selected electronic message conditions for the first message or the second message.

23. The device of claim 14, wherein the server comprises an associated message server.

24. The device of claim 14, wherein a source's relationship to the particular organization, internal to the particular organization or external to the particular organization, is reflected in at least a part of an address portion of electronic messages sent by or on behalf of the source.

25. A non-transitory computer-readable storage medium with an executable program stored thereon, wherein the program instructs a microprocessor to perform the following steps:
enabling, via a user interface, configuration of a first message and a second message, the user interface indicating the first message being configured to be sent as at least a portion of an automatic reply electronic message in reply to an electronic message received from a source internal to a particular organization and the second message being configured to be sent as at least a portion of an automatic reply electronic message in reply to an electronic message received from a source external to the particular organization;
enabling, via the user interface, modification of at least one of the first message or the second message; and
transmitting the configuration to an electronic message server.

26. The computer-readable storage medium of claim 25, wherein the program instructs the microprocessor to perform the following step:
enabling, via the user interface, configuration of a third message, the user interface indicating the third message being configured to be sent as at least a portion of an automatic reply electronic message in reply to both an electronic message received from a source internal to the particular organization and a electronic message received from a source external to the particular organization.

27. The computer-readable storage medium of claim 25, wherein the particular organization represents a class, wherein users internal to the particular organization are included in the class, and wherein users external to the organization are not included in the class.

28. The computer-readable storage medium of claim 27, wherein the class of a user is indicated by associated information stored in an address book.

29. The computer-readable storage medium of claim 25, wherein the particular organization represents a category, wherein users internal to the particular organization are included in the category and wherein users external to the particular organization are not included in the category.

30. The computer-readable storage medium of claim 29, wherein the category is one of personal, customer, and supplier.

31. The computer-readable storage medium of claim 29, wherein the category of a user is indicated by associated information stored in an address book.

32. The computer-readable storage medium of claim 25, wherein the program instructs the microprocessor to perform the following step:

enabling, via the user interface, selection from among a set of electronic message conditions associated with one or more of the messages.

33. The computer-readable storage medium of claim 32, wherein the configuration includes one or more of the selected electronic message conditions for the first message or the second message.

34. The computer-readable storage medium of claim 25, wherein the server comprises an associated message server.

35. The computer-readable storage medium of claim 34, wherein the program instructs the microprocessor to perform the following steps:

receiving, by the associated message server, the configuration;

transmitting, by the associated message server, automatic reply electronic messages in accordance with the configuration.

36. The computer-readable storage medium of claim 25, wherein a source's relationship to the particular organization, internal to the particular organization or external to the particular organization, is reflected in at least a part of an address portion of electronic messages sent by or on behalf of the source.

37. The computer-readable storage medium of claim 34, wherein the program instructs the microprocessor to perform the following steps:

receiving an email message from a particular source; and
determining whether the particular source is considered to be internal to the particular organization or external to the particular organization based on at least a part of an address portion of electronic messages sent by or on behalf of the source.

\* \* \* \* \*